United States Patent
Chang

[19]

[11] Patent Number: 6,065,765
[45] Date of Patent: May 23, 2000

[54] METHOD OF MOLDING AND ASSEMBLING A BICYCLE FRAME

[76] Inventor: Richard M. Chang, 1 Wicks Dr., Ajax, Ontario, Canada, L1Z 1C4

[21] Appl. No.: 08/736,126

[22] Filed: Oct. 24, 1996

[51] Int. Cl.$^7$ ..................................................... B62K 1/00
[52] U.S. Cl. ................... 280/288.3; 280/274; 280/281.1
[58] Field of Search ................................ 280/274, 281.1, 280/288.3, 200, 259, 279, 280

[56] References Cited

U.S. PATENT DOCUMENTS

| | | | |
|---|---|---|---|
| 575,353 | 1/1897 | Jeffery | 280/274 |
| 629,401 | 7/1899 | Smyser | 280/274 |
| 3,889,975 | 6/1975 | Falconi | 280/281.1 |
| 4,548,422 | 10/1985 | Michel et al. | 280/288.3 |
| 4,850,607 | 7/1989 | Trimble | 280/281.1 |
| 5,011,172 | 4/1991 | Bellanca et al. | 280/288.3 |
| 5,464,240 | 11/1995 | Robinson et al. | 280/288.3 |

FOREIGN PATENT DOCUMENTS

| | | | |
|---|---|---|---|
| 270277 | 7/1989 | Germany | 280/288.3 |
| 16234 | 1/1898 | Switzerland | 280/288.3 |
| 22417 | of 1893 | United Kingdom | 280/288.3 |
| 20999 | of 1897 | United Kingdom | 280/281.1 |
| 561 | of 1897 | United Kingdom | 280/288.3 |
| 1281731 | 7/1972 | United Kingdom | 280/288.3 |

*Primary Examiner*—Daniel G. DePumpo

[57] ABSTRACT

A new Method of Molding and Assembling a Bicycle Frame for offering a lighter, less expensive bicycle frame. The inventive device includes a frame assembly having a first half, a second half, and a front fork joint. In use, referring to FIG. 6, the first half 11 and the second half 13 are molded side by side. Then, after trimming, the first half 11 and the second half 13 are matingly joined together. The axle clamp housing 31 is then fixed to the drive wheel joint 30, and the pedal busing 22, the seat support bushing 42, and the front fork bushing 52 are installed, completing the frame assembly 12. A typical bicycle handle bar, pedals, drive wheel, front steer wheel, and seat are then assembled to the frame assembly 12, completing an overall assembly of the bicycle.

11 Claims, 3 Drawing Sheets

METHOD OF MOLDING AND ASSEMBLING A BICYCLE FRAME

BACKGROUND OF THE INVENTION

1. Field of the Invention

The present invention relates to bicycle frames and more particularly pertains to a new Method of Molding and Assembling a Bicycle Frame for offering a lighter, less expensive bicycle frame.

2. Description or the Prior Art

The use of bicycle frames is known in the prior art. More specifically, bicycle frames heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle frames include U.S. Pat. No 4,982,975; U.S. Pat. No. 4,902,458; U.S. Pat. No. 4,889,355; U.S. Pat. No. 5,116,071; U.S. Pat. No. 4,015,854 and U.S. Pat. No. 343,598.

While these devices fulfill their respective, particular objectives and requirements, the aforementioned patents do not disclose a new Method of Molding and Assembling a Bicycle Frame. The inventive device includes a frame assembly having a first half, a second half, and a front fork joint.

In these respects, the Method of Molding and Assembling a Bicycle Frame according to the present invention substantially departs from the conventional concepts and designs of the prior art, and in so doing provides an apparatus primarily developed for the purpose of offering a lighter, less expensive bicycle frame.

SUMMARY OF THE INVENTION

In view of the foregoing disadvantages inherent in the known types of bicycle frames now present in the prior art, the present invention provides a new Method of Molding and Assembling a Bicycle Frame construction wherein the same can be utilized for offering a lighter, less expensive bicycle frame.

The general purpose of the present invention, which will be described subsequently in greater detail, is to provide a new Method of Molding and Assembling a Bicycle Frame apparatus and method which has many of the advantages of the bicycle frames mentioned heretofore and many novel features that result in a new Method of Molding and Assembling a Bicycle Frame which is not anticipated, rendered obvious, suggested, or even implied by any of the prior art Bicycle Frames, either alone or in any combination thereof.

To attain this, the present invention generally comprises a frame assembly having a first half, a second half, and a front fork joint.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Method of Molding and Assembling a Bicycle Frame apparatus and method which has many of the advantages of the bicycle frames mentioned heretofore and many novel features that result in a new Method of Molding and Assembling a Bicycle Frame which is not anticipated, rendered obvious, suggested, or even implied by any of the prior art Bicycle Frames, either alone or in any combination thereof.

It is another object of the present invention to provide a new Method of Molding and Assembling a Bicycle Frame which may be easily and efficiently manufactured and marketed.

It is a further object of the present invention to provide a new Method of Molding and Assembling a Bicycle Frame which is of a durable and reliable construction.

An even further object of the present invention is to provide a new Method of Molding and Assembling a Bicycle Frame which is susceptible of a low cost of manufacture with regard to both materials and labor, and which accordingly is then susceptible of low prices of sale to the consuming public, thereby making such Method of Molding and Assembling a Bicycle Frame economically available to the buying public.

Still yet another object of the present invention is to provide a new Method of Molding and Assembling a Bicycle Frame which provides in the apparatuses and methods of the prior art some of the advantages thereof, while simultaneously overcoming some of the disadvantages normally associated therewith.

Still another object of the present invention is to provide a new Method of Molding and Assembling a Bicycle Frame for offering a lighter, less expensive bicycle frame.

Yet another object of the present invention is to provide a new Method of Molding and Assembling a Bicycle Frame which includes a frame assembly having a first half, a second half, and a front fork joint.

Still yet another object of the present invention is to provide a new Method of Molding and Assembling a Bicycle Frame that is easier and less expensive to make using known molding technology.

Even still another object of the present invention is to provide a new Method of Molding and Assembling a Bicycle Frame that allows the use of known subassembly bicycle parts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
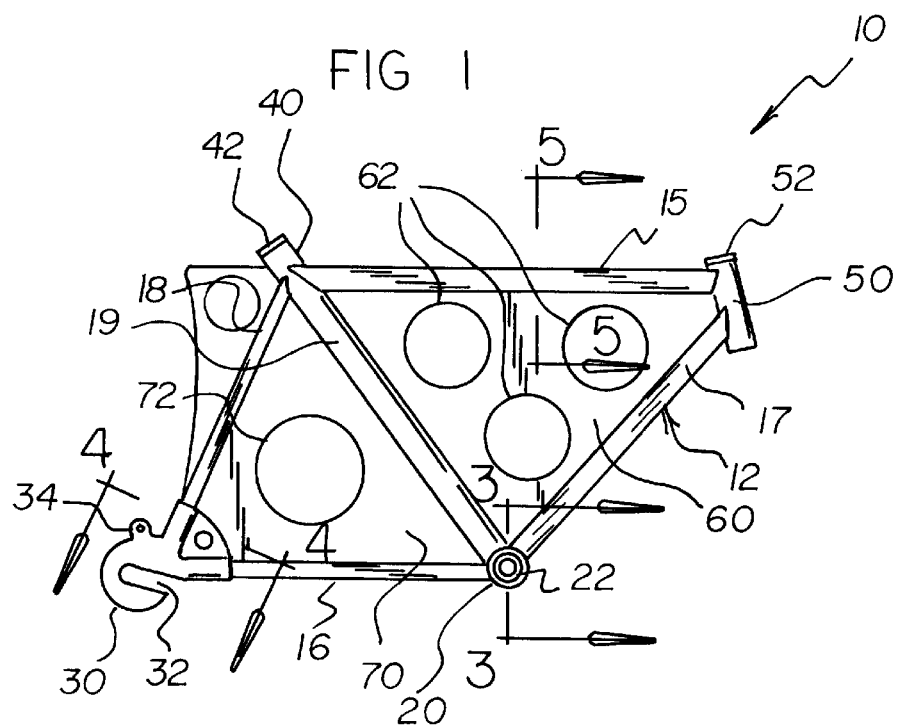
FIG. 1 is a right side elevation view of a new Method of Molding and Assembling a Bicycle Frame according to the present invention.
Figure 2:
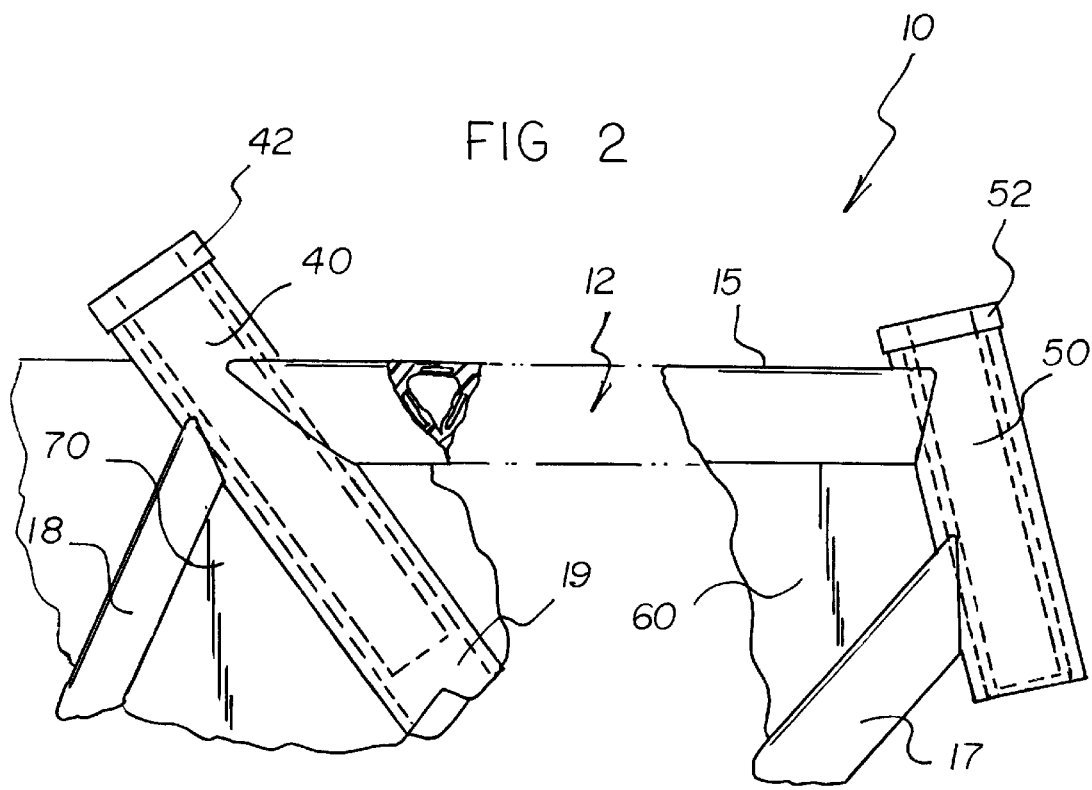
FIG. 2 is an enlarged side elevation view of a seat support and a front fork joint according to the present invention.
Figure 3:
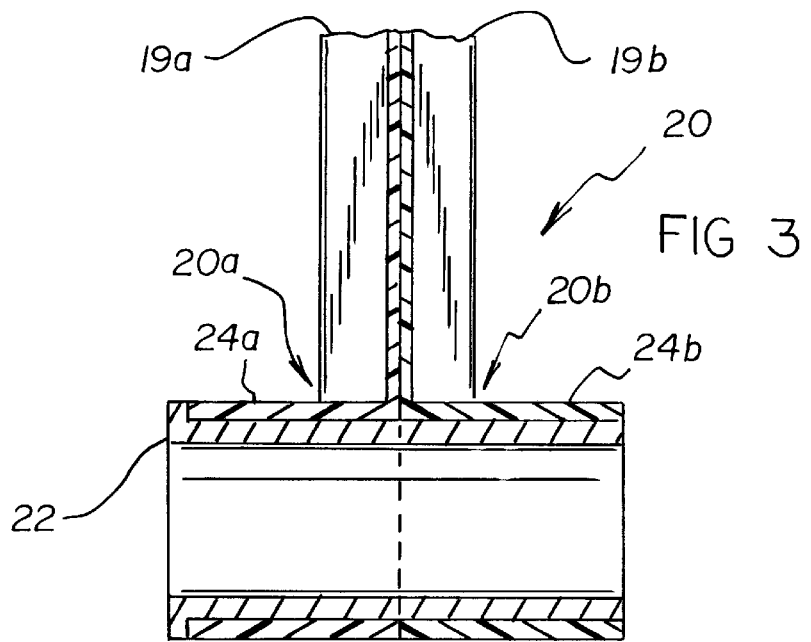
FIG. 3 is a cross sectional view taken along line 3—3 of FIG. 1.
Figure 4:
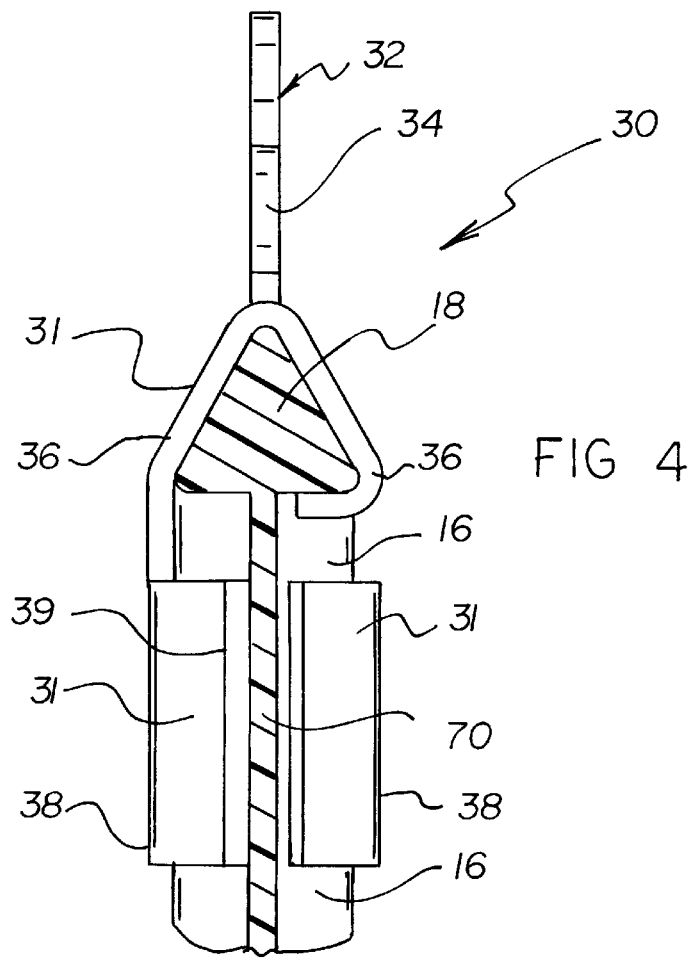
FIG. 4 is a cross sectional view taken along line 4—4 of FIG. 1.

With reference now to the drawings, and in particular to FIGS. 1 through 6 thereof, a new Method of Molding and Assembling a Bicycle Frame embodying the principles and concepts of the present invention and generally designated by the reference numeral 10 will be described.

More specifically, it will be noted that the Method of Molding and Assembling a Bicycle Frame 10 comprises a frame assembly having a first half 11, a second half 13, and a front fork joint 50.

As best illustrated in FIGS. 1 through 6, it can be shown that the first half 11, and the second half 13 are matingly joined together and form the front fork joint 50. Additionally, when joining the first half 11, and the second half 13 together, a pedal joint 20, a drive wheel joint 30, and a seat support 40 are also formed.

Furthermore, the first half 11, and the second half 13, when joined together, comprise a frame assembly 12, which includes a top frame tube 15, a bottom frame tube 16, a front frame tube 17, a rear frame tube 18, and a center support tube 19, all of which are integrally joined together in continuous arrangement. Tubes 16, 18, 19 should create a wishbone effect to accommodate the rear wheel.

Figure 5:
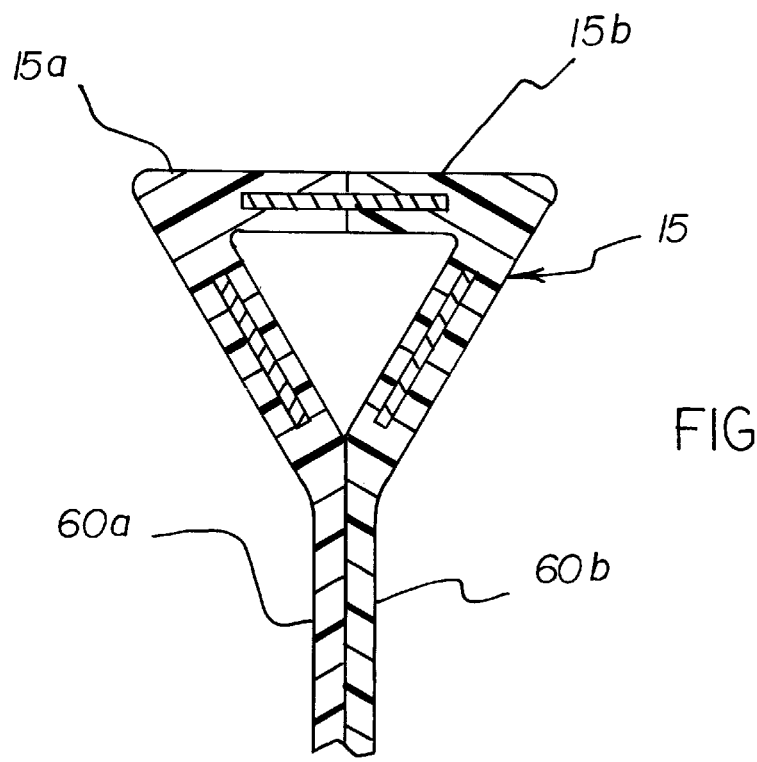
FIG. 5 is a cross sectional view taken along line 5—5 of FIG. 1.

The top frame tube 15 further includes a top frame tube left half 15a and a top frame tube right half 15b. The bottom frame tube 16 further includes a bottom frame tube left half 16a and a top frame tube right half 16b. The front frame tube 17 further includes a front frame tube left half 17b, and a front frame tube right 17b. The rear frame tube 18 further includes a rear frame tube left half 18a and a rear frame tube right half 18b. The most preferred cross-sectional shape for tubes 15, 16, 17, and 18 is substantially triangular, as shown in FIG. 5. The center support tube 19 further includes a center support tube left half 19a and a center support tube right half 19b, and is preferably circular in cross-section.

The pedal joint 20 is further comprised of a pedal bushing housing 24 which matingly and fixedly receives a pedal bushing 22. The pedal bushing housing 24 is a vertex juncture of the front frame tube 17, the center support tube 19, and bottom tube 16 and is further defined as a pedal bushing housing left half 24a and a pedal bushing housing right half 24b.

The seat support 40 is further comprised of a seat support bushing housing 44 which matingly and fixedly receives a seat support bushing 42. The seat support bushing housing 44 is a vertex juncture of the rear frame tube 18, the center support tube 19, and the top frame tube 15, and is further defined as a seat support bushing housing left half 44a and a seat support bushing housing right half 44b.

The front fork joint 50 is further comprised of a front fork bushing housing 54 which matingly and fixedly receives a front fork bushing 52. The front fork bushing housing 54 is a vertex juncture of the front frame tube 17 and the top frame tube 15, and is further defined as a front fork bushing housing left half 54a and a front fork bushing housing right half 54b.

The drive wheel joint 30 is a vertex juncture of the rear frame tube 18 and the bottom frame tube 16, and further includes an axle clamp housing 31, an axle aperture 32, a cable aperture 34, a first tube clamp 36, a second tube clamp 38, and a mounting flange 39, where the mounting flange 39 is fixedly fastened to a rear support wall 70 which integrally connects an inner periphery of the rear frame tube 18, the center support tube 19, and the bottom frame tube 16. The mounting flange 39 may be fixedly coupled to the rear support wall 70 by any suitable means known in the art, including welding. The second tube clamp 38 matingly, fixedly, circumferenitially, and substantially encompasses the bottom frame tube 16. The first tube clamp 36 matingly, fixedly, circumferentially, and substantially encompasses the rear frame tube 18.

The first tube clamp 36, and the second tube clamp 38, substantially comprise the axle clamp housing 31 which in turn also includes the axle aperture 32, and the cable aperture 34 which are further defined as extensions of the axle clamp housing 31.

Additionally, a front support wall 60 integrally connects an inner periphery of the front frame tube 17, the center support tube 19, and the top frame tube 15. The rear support wall 70 further includes a plurality of rear cutouts 72 and the front support wall 60 further includes a plurality of front cutouts 62.

Each of the top 15 and bottom 16 and front 17 and rear 18 frame tubes has a first 26, second 27, and third 28 sides (see FIG. 5 showing top frame tube 15) extending along the longitudinal axis of the frame tube. Each of the sides of the top and bottom and front and rear frame tubes has a channel 46, 47, 48 extending through the side 26, 27, 28. The channel extends along the longitudinal axis of the associated frame tube (see FIG. 2). Each of the sides of the top and bottom and front and rear frame tubes has a support bar 56, 57, 58 extending through the channel 46, 47, 48 in the side 26, 27, 28.

Figure 6:
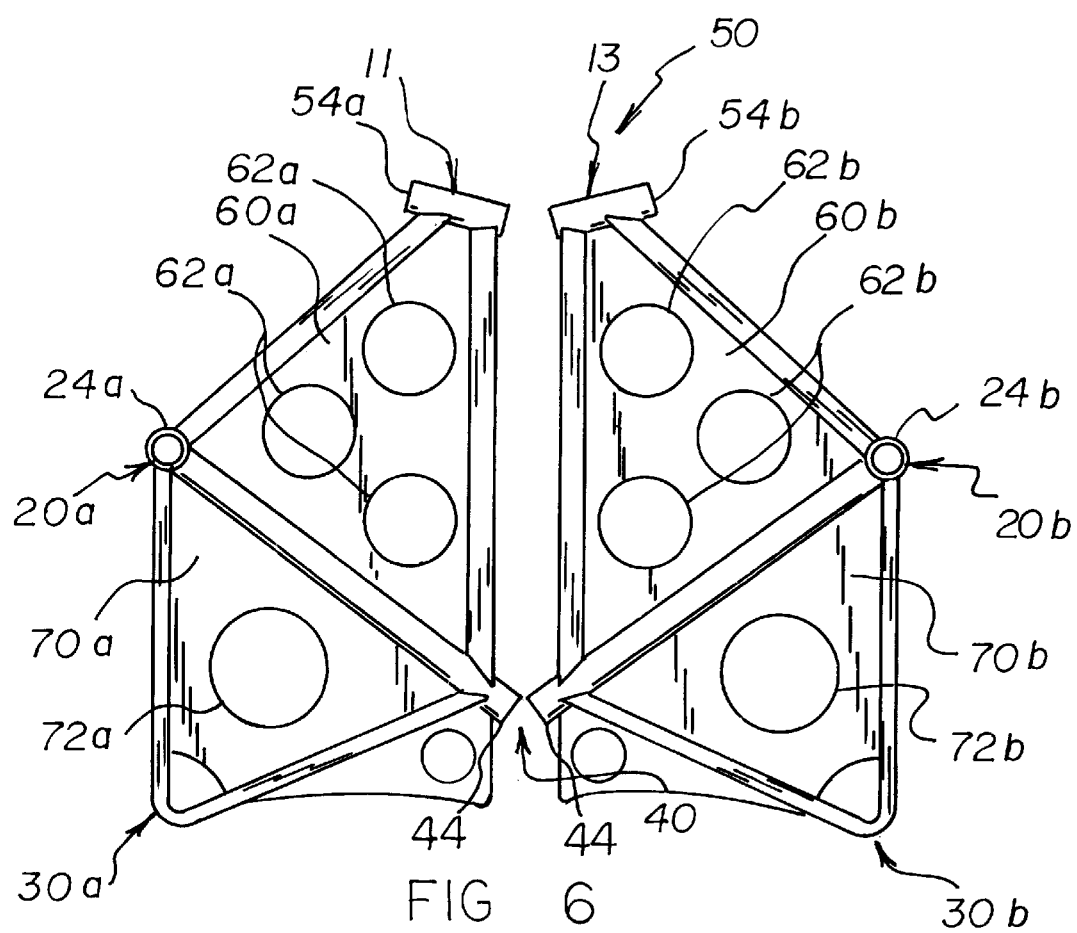
FIG. 6 is a side elevation view of a left half and a right half of the present invention.

In use, referring to FIG. 6, the first half 11 and the second half 13 are molded side by side. Then, after trimming, the first half 11 and the second half 13 are matingly joined together. The axle clamp housing 31 is then fixed to the drive wheel joint 30, and the pedal busing 22, the seat support bushing 42, and the front fork bushing 52 are installed, completing the frame assembly 12. A typical bicycle handle bar, pedals, drive wheel, front steer wheel, and seat are then assembled to the frame assembly 12, completing an overall assembly of the bicycle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle frame comprising:
   a first half, a second half, and a front fork joint all integrally connected;
   wherein the first half, and the second half, when joined together, comprise a frame assembly including an elongate top frame tube, an elongate bottom frame tube, an elongate front frame tube, an elongate rear frame tube, and an elongate center support tube, each of the tubes being integrally joined together in continuous arrangement;
   each of the top and bottom and front and rear frame tubes having a substantially triangular transverse cross section taken perpendicular to longitudinal axes thereof, each of the top and bottom and front and rear frame tubes having first, second, and third sides extending along the longitudinal axis of the frame tube;
   wherein each of the sides of the top and bottom and front and rear frame tubes has a channel extending through the side and extending along the longitudinal axis of the associated frame tube; and
   each of the sides of the top and bottom and front and rear frame tubes having a support bar extending through the channel in the side.

2. The bicycle frame of claim 1, wherein the first half and the second half are matingly joined together to form the front fork joint and a pedal joint, a drive wheel joint, and a seat support.

3. The bicycle frame of claim 1, wherein the sides of each of the frame tubes are oriented at about a 45 degree angle from each other.

4. The bicycle frame of claim 1, wherein the top frame tube includes a top frame tube left half and a top frame tube right half, the bottom frame tube includes a bottom frame tube left half and a top frame tube right half, the front frame tube includes a front frame tube left half and a front frame tube right half, the rear frame tube includes a rear frame tube left half and a rear frame tube right half, and the center support tube includes a center support tube left half and a center support tube right half.

5. The bicycle frame of claim 1, wherein the pedal joint comprises a pedal bushing housing which matingly and fixedly receives a pedal bushing and wherein the pedal bushing housing is a vertex juncture of the front frame tube, the center support tube, and the rear frame tube, and wherein the pedal bushing housing comprises a pedal bushing housing left half and a pedal bushing housing right half.

6. The bicycle frame of claim 1, additionally comprising a seat support including a seat support bushing housing which matingly and fixedly receives a seat support bushing and wherein the seat support bushing housing is a vertex juncture of the rear frame tube, the center support tube, and the top frame tube, and wherein the top frame tube housing comprises a seat support bushing housing left half and a seat support bushing housing right half.

7. The bicycle frame of claim 1, wherein the front fork joint comprises a front fork bushing housing which matingly and fixedly receives a front fork bushing and wherein the front fork bushing housing is a vertex juncture of the front frame tube and the top frame tube, and wherein the front fork busing housing comprises a front fork bushing housing left half and a front fork bushing housing right half.

8. The bicycle frame of claim 1, wherein the drive wheel joint is a vertex juncture of the rear frame tube and the bottom frame tube, and wherein the drive wheel joint includes an axle clamp housing, an axle aperture, a cable aperture, a first tube clamp, a second tube clamp, and a mounting flange, wherein the mounting flange is fixedly fastened to a rear support wall which integrally connects an inner periphery of the rear frame tube, the center support tube, and the bottom frame tube, and wherein the second tube clamp matingly, fixedly, and circumferentially encompasses the bottom frame tube, and wherein the first tube clamp matingly, fixedly, and circumferentially encompasses the rear frame tube.

9. The bicycle frame of claim 8, wherein the first tube clamp and the second tube clamp form the axle clamp housing including the axle aperture, and the cable aperture comprises an extension of the axle clamp housing.

10. The bicycle frame of claim 1, wherein a front support wall integrally connects an inner periphery of the front frame tube, the center support tube, and the top frame tube, and wherein the rear support wall includes a plurality of rear cutouts, and the front support wall includes a plurality of front cutouts.

11. A bicycle frame comprising:
    a first half, a second half, and a front fork joint all integrally connected;
    wherein the first half, and the second half, when joined together, comprise a frame assembly including an elongate top frame tube, an elongate bottom frame tube, an elongate front frame tube, an elongate rear frame tube, and an elongate center support tube, each of the tubes being integrally joined together in continuous arrangement;
    each of the top and bottom and front and rear frame tubes having a substantially triangular transverse cross section taken perpendicular to longitudinal axes thereof, each of the top and bottom and front and rear frame tubes having first, second, and third sides extending along the longitudinal axis of the frame tube;
    wherein each of the sides of the top and bottom and front and rear frame tubes has a channel extending through the side and extending along the longitudinal axis of the associated frame tube; and
    each of the sides of the top and bottom and front and rear frame tubes having a support bar extending through the channel in the side;

wherein the first half and the second half are matingly joined together to form the front fork joint and a pedal joint, a drive wheel joint, and a seat support;

wherein the sides of each of the frame tubes are oriented at about a 45 degree angle from each other;

wherein the top frame tube includes a top frame tube left half and a top frame tube right half, the bottom frame tube includes a bottom frame tube left half and a top frame tube right half, the front frame tube includes a front frame tube left half and a front frame tube right half, the rear frame tube includes a rear frame tube left half and a rear frame tube right half, and the center support tube includes a center support tube left half and a center support tube right half;

wherein the pedal joint comprises a pedal bushing housing which matingly and fixedly receives a pedal bushing and wherein the pedal bushing housing is a vertex juncture of the front frame tube, the center support tube, and the rear frame tube, and wherein the pedal bushing housing comprises a pedal bushing housing left half and a pedal bushing housing right half;

a seat support including a seat support bushing housing which matingly and fixedly receives a seat support bushing and wherein the seat support bushing housing is a vertex juncture of the rear frame tube, the center support tube, and the top frame tube, and wherein the top frame tube housing comprises a seat support bushing housing left half and a seat support bushing housing right half;

wherein the front fork joint comprises a front fork bushing housing which matingly and fixedly receives a front fork bushing and wherein the front fork bushing housing is a vertex juncture of the front frame tube and the top frame tube, and wherein the front fork busing housing comprises a front fork bushing housing left half and a front fork bushing housing right half;

wherein the drive wheel joint is a vertex juncture of the rear frame tube and the bottom frame tube, and wherein the drive wheel joint includes an axle clamp housing, an axle aperture, a cable aperture, a first tube clamp, a second tube clamp, and a mounting flange, wherein the mounting flange is fixedly fastened to a rear support wall which integrally connects an inner periphery of the rear frame tube, the center support tube, and the bottom frame tube, and wherein the second tube clamp matingly, fixedly, and circumferentially encompasses the bottom frame tube, and wherein the first tube clamp matingly, fixedly, and circumferentially encompasses the rear frame tube;

wherein the first tube clamp and the second tube clamp form the axle clamp housing including the axle aperture, and the cable aperture comprises an extension of the axle clamp housing;

wherein a front support wall integrally connects an inner periphery of the front frame tube, the center support tube, and the top frame tube, and wherein the rear support wall includes a plurality of rear cutouts, and the front support wall includes a plurality of front cutouts.

* * * * *